UNITED STATES PATENT OFFICE.

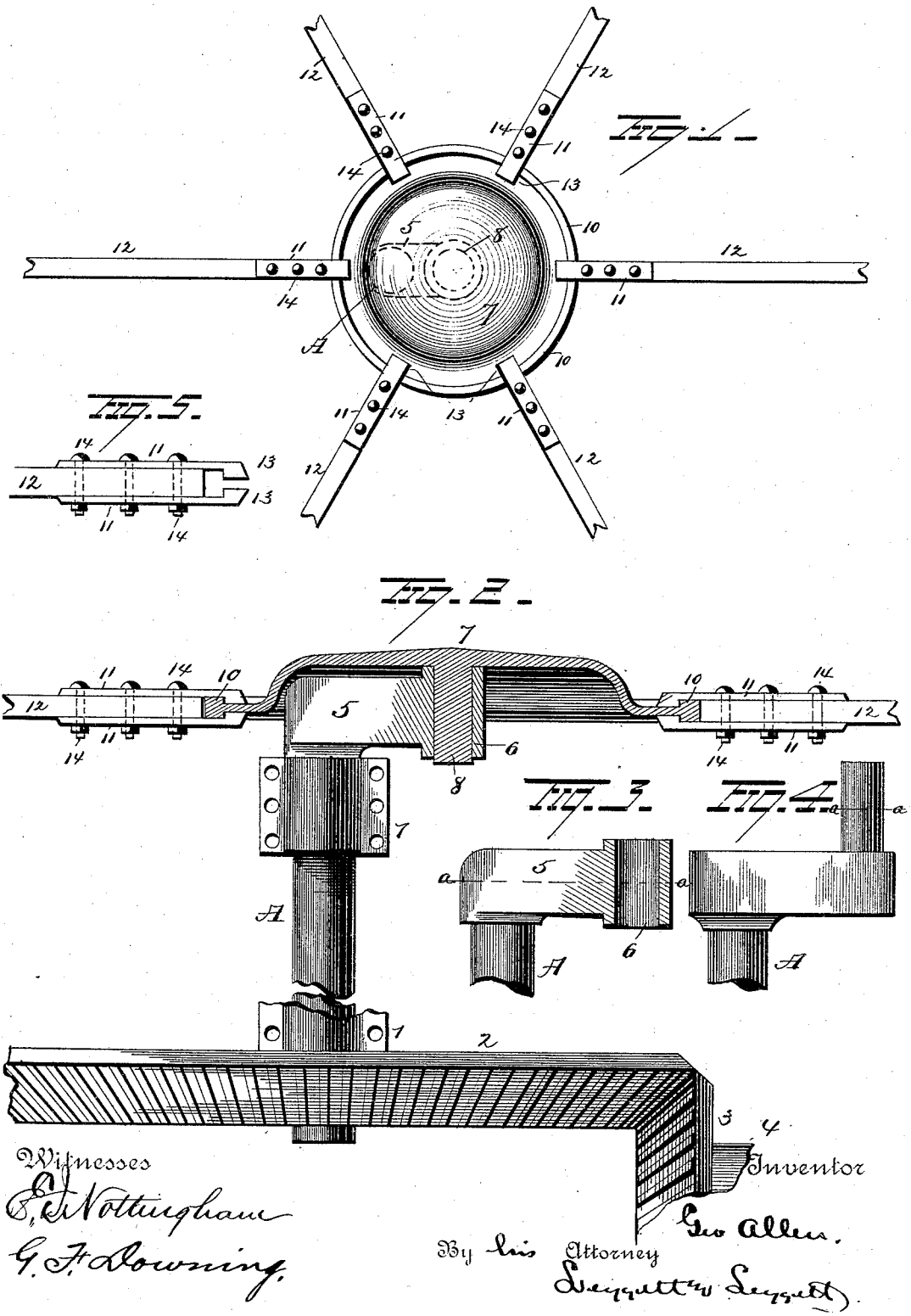

GEORGE ALLEN, OF FRANKLIN, PENNSYLVANIA.

APPARATUS FOR PUMPING OIL-WELLS.

SPECIFICATION forming part of Letters Patent No. 416,206, dated December 3, 1889.

Application filed July 26, 1889. Serial No. 318,751. (No model.)

*To all whom it may concern:*

Be it known that I, GEORGE ALLEN, of Franklin, in the county of Venango and State of Pennsylvania, have invented certain new and useful Improvements in Apparatus for Pumping; and I do hereby declare the following to be a full, clear, and exact description of the invention, such as will enable others skilled in the art to which it appertains to make and use the same.

My invention relates to an improvement in apparatus for pumping oil-wells, and more particularly to an improvement in the invention disclosed in Letters Patent No. 313,907, granted to me March 17, 1885, the essential feature of which consisted in a disk adapted to the attachment of several pump-actuating rods or pitmen and mounted on the wrist-pin of a crank secured to the end of a vertical shaft. Generally speaking, this has worked well, and in consequence has gone into extensive use; but in pumping a large number of wells where great power is required it has been discovered that the center of the wrist-pin lengthwise, where the strain falls, was so far above the top box that the shaft sometimes becomes sprung or the box is broken. On these machines the line of draft comes about thirteen inches above the top box, thus making considerable unnecessary leverage.

The object of my present invention is to reduce this leverage and bring the line of draft nearer the box, thus decreasing the leverage about two-thirds and overcoming the difficulties sometimes encountered heretofore.

To this end the invention consists in an inverted saucer-shaped disk having a wrist-pin set in the center of the concaved face in connection with a crank which has a hole or socket therein to receive the wrist.

It further consists in devices for attaching the rod to the disk and in certain other novel features of construction and combinations of parts, as will be hereinafter fully described, and pointed out in the claims.

In the accompanying drawings, Figure 1 is a plan view of the wheel or disk, showing the connecting-rods secured thereto. Fig. 2 is a view of the shaft-disk and gearing, parts being in elevation and parts in section. Figs. 3 and 4 are views of the new and old forms of cranks employed, the dotted lines thereon indicating the line of draft; and Fig. 5 is a detached view of the actuating-rod coupling.

A represents a vertical shaft revolubly mounted in boxes 1 1 and driven by bevel gear-wheels 2 and 3, the former being secured to the vertical shaft and the latter to the engine-shaft 4. The vertical shaft is provided at its upper end with a rigid crank 5, and in the outer end of this crank a hole or socket 6 is formed.

The numeral 7 represents the wheel or disk. It is dished out in the center or saucer-shaped, so that its edges depend to a horizontal plane, which passes about midway through the center of the crank. A wrist-pin 8 depends from the center of the disk or wheel, where it is rigidly secured, and is fitted loosely into the hole or socket 6 in the crank 5. The crank is so short that it revolves within the disk, and hence the line of draft always remains unchanged or in the same plane. By means of this construction the line of draft is transferred from the point indicated by the dotted line *a a* in Fig. 4 to the point indicated by a corresponding line in Fig. 3, making a difference of about eight and a half inches, or decreasing the leverage by about two-thirds. The means of connecting the rod to the wheel or disk is also novel. On its periphery the wheel or disk is provided with the thickened rim or the upper and lower annular ribs 10 10. A pair of straps 11 11 are bolted on the ends of each connecting-rod 12. These straps are provided with projections 13 13 on their ends, which meet the disk inside of the rim or ribs, as shown in Fig. 2. Bolts or screws 14 extend through these plates or straps and hold them together. While experiment has thus far proved this to be about the best mode of attachment, it is not the only way of effecting the coupling, as other means might be employed.

It is evident that slight changes might be resorted to in the form and arrangement of the several parts described without departing from the spirit and scope of my invention, and hence I do not wish to limit myself to the particular construction herein set forth; but, Having fully described my invention, what I claim as new, and desire to secure by Letters Patent, is—

1. In an apparatus for pumping oil-wells, the combination, with a shaft and a crank secured thereto, of a disk having loose connection with the crank, and connecting-rods secured to the disk in such position as to throw the line of draft into a plane extending through the crank, substantially as set forth.

2. In an apparatus for pumping oil-wells, the combination, with a shaft and a crank secured thereto, this crank having a hole or socket at its outer end, of an inverted saucer-shaped disk having a central wrist-pin, which enters the hole or socket in the crank, and connecting-rods coupled to the periphery in a plane which passes through the crank, substantially as set forth.

3. The combination, with a vertical shaft revolubly supported in suitable boxes or bearings, a crank rigidly secured to its upper end, this crank having a hole or socket therein, and suitable gearing, of an inverted saucer-shaped disk or wheel, the periphery of which has a thickened ridge, which extends into a plane which passes centrally through the crank, a wrist-pin projecting from the center of the disk into the socket in the crank, connecting-rods, straps having projections at their ends, and means for securing them to the enlarged periphery of the disk, substantially as set forth.

4. The combination, with a shaft, a crank, and a disk having an enlarged periphery, of connecting-rods, straps having projections thereon adapted to engage the periphery of the disk, and bolts or screws for securing the straps to the rods, substantially as set forth.

In testimony whereof I have signed this specification in the presence of two subscribing witnesses.

GEORGE ALLEN.

Witnesses:
G. S. McDOWELL,
MARCUS A. FRY.